United States Patent [19]
Meier et al.

[11] Patent Number: 5,466,915
[45] Date of Patent: Nov. 14, 1995

[54] TRAY TRANSPORT CART HAVING ELECTROMAGNETIC INDUCTION HEATERS FOR HEATING MEALS TO BE PLACED ON THE TRAYS

[75] Inventors: Herman Meier, Littau; Martin Witzig, Horgen, both of Switzerland

[73] Assignee: Berndorf Luzern A.G., Littau, Switzerland

[21] Appl. No.: 133,710

[22] Filed: Oct. 7, 1993

[30] Foreign Application Priority Data

Oct. 7, 1992 [CH] Switzerland .............. 3129/92

[51] Int. Cl.$^6$ .................................................. H05B 6/12
[52] U.S. Cl. .................. 219/622; 99/451; 99/DIG. 14; 219/621; 219/660; 312/236
[58] Field of Search ................... 219/621, 622, 219/623, 624, 647, 660; 312/236; 99/451, DIG. 14, 416

[56] References Cited

U.S. PATENT DOCUMENTS

| | | | |
|---|---|---|---|
| 3,777,094 | 12/1973 | Peters, Jr. ................... | 219/624 |
| 3,786,222 | 1/1974 | Harnden, Jr. et al. ............ | 219/624 |
| 3,979,572 | 9/1976 | Ito et al. ................... | 219/624 |
| 4,020,310 | 4/1977 | Souder, Jr. et al. ............ | 219/622 |
| 4,235,282 | 11/1980 | de Filippis et al. ........... | 312/236 |
| 5,204,504 | 4/1993 | Tanaka ....................... | 219/663 |

FOREIGN PATENT DOCUMENTS

| | | |
|---|---|---|
| 0203883 | 12/1986 | European Pat. Off. . |
| 0285552 | 10/1988 | European Pat. Off. . |
| 0506583 | 9/1992 | European Pat. Off. . |
| 2345123 | 10/1977 | France . |
| 2711088 | 9/1978 | Germany . |
| 9213948 U | 10/1992 | Germany . |
| 2061981 | 3/1990 | Japan . |

*Primary Examiner*—Philip H. Leung
*Attorney, Agent, or Firm*—Helfgott & Karas

[57] ABSTRACT

A tray transport cart which accommodates trays for holding dishes for containing meals has a movable cart body with a plurality of tray carriers installed therein. Induction coils are inserted into the tray carriers for generating a local electromagnetic field. The trays hold the dishes which are provided with a current-conducting layer. An HF generator positioned on the cart body cooperates with the induction coils to produce the total inductance of the coils to generate a desired induction current in the current-conducting layer of the dishes, in the range between 32 μH and 76 μH, to maintain the meals contained in the dishes at warm temperatures.

10 Claims, 2 Drawing Sheets

TRAY TRANSPORT CART HAVING ELECTROMAGNETIC INDUCTION HEATERS FOR HEATING MEALS TO BE PLACED ON THE TRAYS

BACKGROUND OF THE INVENTION

The invention pertains to a device for transporting and maintaining the temperature of meals.

Devices of this type are primarily used in institutional kitchens of hospitals and factory cafeterias in which the given meals must be transported from the kitchen to the respective patient supply stations or issuing stations. It is very important to keep the meals which are prepared at different temperatures warm during this transport. During the transport to the respective issuing stations the hot meals are usually placed in suitable transport carts and covered by a metal or plastic dome, in the following also referred to as a cloche. Such transport carts are sufficiently known to the expert and usually consist of a metal cabinet into which several trays may be inserted one atop the other. However, it has been established that the heated meals cool in an undesired fashion during the transport despite being covered by a cloche.

This is the reason why it has already been suggested to reheat the transported meals in a suitable cabinet. However, this process is exceptionally complicated and impractical for different reasons. The meals prepared at different temperatures may not be easily reheated individually, and the reloading of the individual trays is connected with additional labor. The reheating of once-prepared meals is for physiological reasons unacceptable since the reheating of the meals may lead to oxidations or the formation of toxic substances.

This is also the reason why different countries have enacted legal regulations concerning the storing of prepared meals. Specifically, these ordinances prohibit the cooling of meals to a temperature below 65° C.

SUMMARY OF THE INVENTION

It is an object of the present invention to introduce a device for maintaining the temperature of the individual meals may be maintained at the proper level, wherein a temperature decrease, which is also designated by experts as a "temperature drop," can be prevented.

According to the invention, several products which are especially adapted to each other and interact in a suitable fashion are utilized for this process.

The above and other objects of the invention are attained by a tray transport cart capable of holding dishes for containing meals and heating the meals contained in the dishes.

The invention utilizes a tray transport cart in which the inserted meals may be positioned in a suitable fashion and individually heated by means of specially adapted induction heaters; the invention also utilizes a specially designed dish for this process. The transport cart, the trays, and the dishes are constructed in such a way that the meals may be positioned at preset locations, and that the dishes at these locations be exposed to an alternating electromagnetic field. The alternating field is generated by coils arranged within a suitable coil carrier, whereby an alternating current, which is generated by an HF generator installed in the cart, flows through the coils. The generator may be selectively fed by a power line or a battery which may be installed into the tray transport cart. This alternating electromagnetic field induces an induction current in the dish which, according to the invention, is provided with at least one electrically conductive coating, and the induction current leads to the heating of the dish and hence the meal.

According to a particularly preferred variation of the invention, the tray transport cart may accommodate twelve trays arranged one atop the other.

The carts thus have a structural height which allows personnel to reach the individual trays in a very simple fashion. It goes without saying that the generator installed for maintaining the temperature of the meals must be adapted to the quantity of tray storage spaces provided, which means the total inductance of the utilized coil. The generator would otherwise operate at its operating limit, causing damage due to overloads. The HF generator according to the invention is thus designed in such a way that it always operates properly, even if different quantities of meals to be kept warm occupy the tray spaces, meaning a variable load on the induction coils operating within preset limitations. The alternating current required for the generation of the alternating electromagnetic field is in known heating cabinets generated with the aid of a thyristor which is controlled via a corresponding electronic circuit. Current peaks of up to 180 A may occur during the operation of known HF generators used for the induction heating of heating cabinets. The pulse repetition frequency generated by the control circuit amounts to approximately 22 kHz and decreases to almost half this value depending on the load to which the generator is exposed. The efficiency with this type of current control may only be regulated in an inferior fashion.

The HF generator according to the invention is in comparison designed in such a way that the total inductance of the connected coils may vary within a range between 32 µH and 76 µH, but a parallel connected capacitor is selected in such a way that a resonance frequency of approximately 37 kHz results for all above-mentioned inductance values. The invention utilizes an IGBT as the circuit element, which means that all current peaks usually amounting to 150 A are reduced to a maximum of 80 A. A special coating for the dishes is also essential to the design of the warming system according to the invention. It was established that it is essential to provide the dishes to be maintained at different temperatures with an individually adapted coating. It should be possible to maintain the temperature of soup bowls at a different level than, for example, stew bowls or plates. The individual dishes are thus provided with different metallic coatings. This metallic coating is particularly designed in such a way that different current densities may be produced therein due to induction. This is simply obtained by different locally arranged partial coatings. According to a different variation of the invention, the coating is designed in such a way that individual sections of the plates are coated differently, and that said plates are positioned on the tray at a preset location. This measure makes it possible that different meals be maintained at different temperatures on one and the same plate.

According to the invention, the meals are maintained at the proper temperature by a double-walled, insulating cloche which is also provided with a metallic coating. This cloche is essentially exposed to the alternating electromagnetic field of the coil arranged above the same and thus heated. It becomes clear that the heating capacity of the entire system is smoothed and thus additionally improved.

It is essential to the efficiency of the cloche to apply the metallic layer onto the inner side of the insulating layer. The heating of the cloche thus produces a storage space which maintains the proper temperature and may only release its heat into the space enclosed by the storage space, but not release any heat into the interior of the cart in which cool meals, for example, salads, are stored. An additional advantage of such a cloche constructed according to the invention can be seen in the fact that no accumulation of condensation water which would add water to the carefully prepared meal may form on the inner side of the once heated cloche.

The invention is in the following described in detail with the aid of one application example illustrated in the figures.

DETAILED DESCRIPTION OF THE PREFERRED EMBODIMENT

Figure 1:
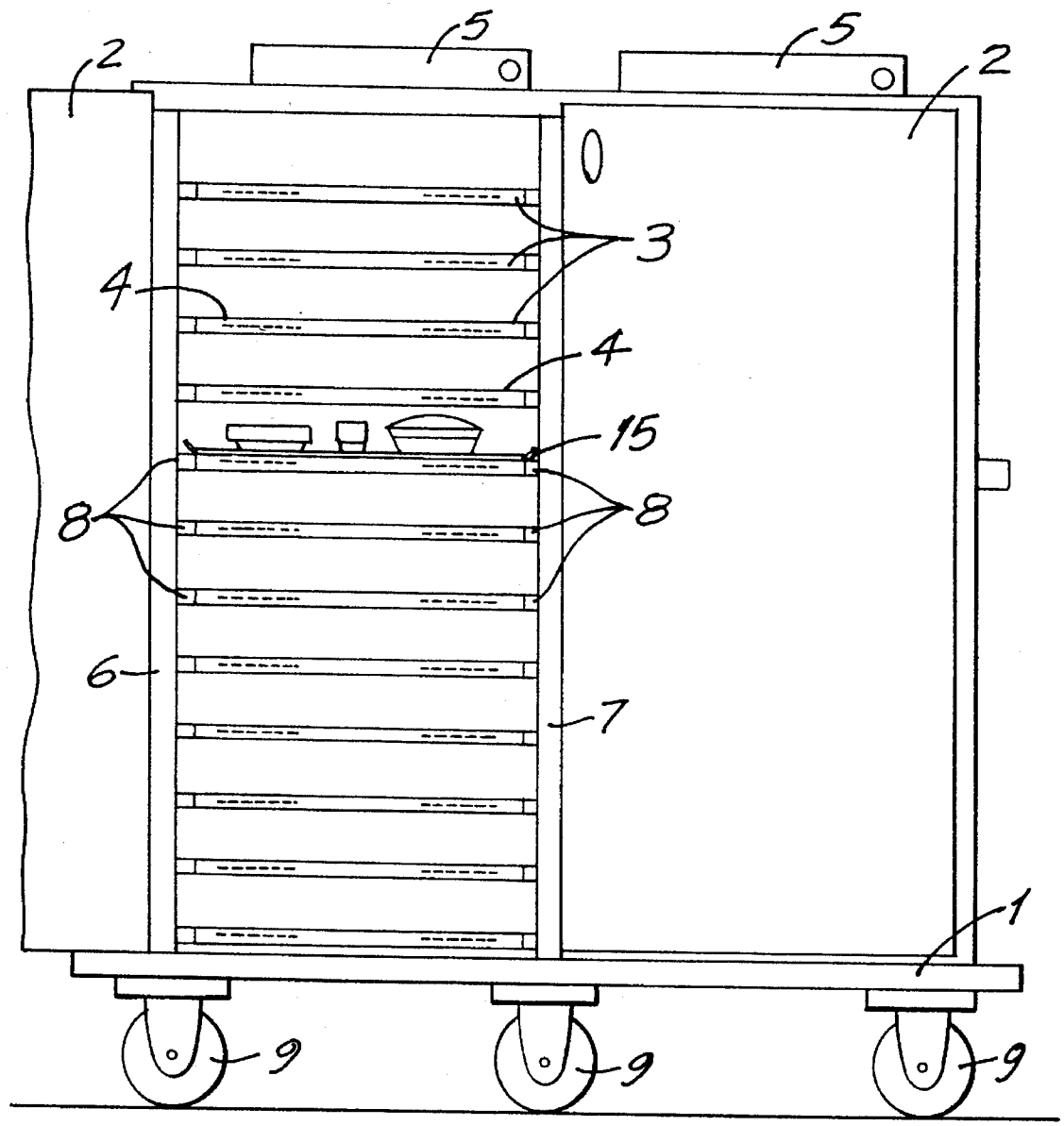
FIG. 1 is an elevational view of a tray transport cart according to the invention.
Figure 3:
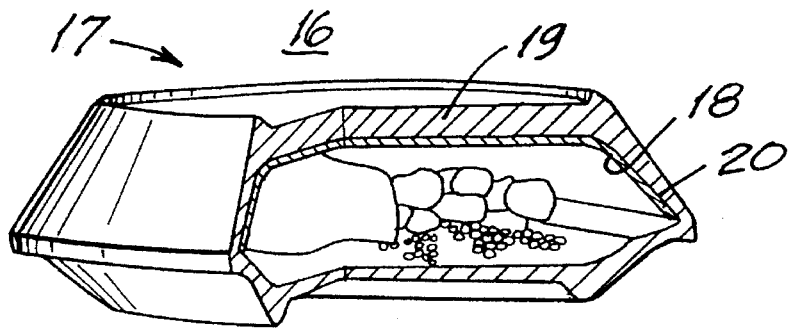
FIG. 3 is a cross section through the cloche according to the invention.

The tray transport cart illustrated in FIG. 1 is an essential element of the arrangement to maintain the proper temperature of meals. The finished meals which are arranged in corresponding dishes 16 (FIG. 3) situated on trays 15 are for transport purposes inserted into the tray transport cart 1. Once a tray 15 loaded with meals is inserted into the cart, a portion of said tray is situated above a coil 4. The meals are placed either in closed or open containers which are provided with an electrically conductive material. The coils 4 connected to the HF generator 5 generate an electromagnetic field. This field induces an induction current in the electrically conductive coating of the dish 16 according to the invention, which in turn causes the dish as well as the meal to be maintained at the proper temperature. Cold meals are positioned on the tray 15 in such a way that they are not situated above the coil 4, and such cold dishes are placed into a dish consisting of a nonconductive material, for example, glass or porcelain, which is not provided with a metallic coating.

The HF generator 5 required for the heating process is usually fed by a power line. The generator 5 is separated from the power line during the transport of the tray transport cart 1 to the different patient supply stations. It is also conceivable that a battery installed in the tray transport cart takes over the function of the power supply of the HF generator. This battery is not essential to the invention and thus not described in detail. Once the tray transport cart has arrived at the respective patient supply station, the generator is reconnected to the power line and fed by the same. An undesired "temperature drop" during the transport may be effectively prevented with the transport cart according to the invention.

The tray transport cart 1 which is manufactured entirely from metal may at its front side be closed by doors 2 and is additionally protected toward the outside against high-frequency electromagnetic interference signals. The interior of the tray transport cart 1 preferably accommodates two rows consisting of twelve layers of coil carriers 3 each, inside of which the induction coils 4 are situated. The induction coils are wired together on the rear side of the tray transport cart 1 and connected to the generator 5. In this particular case, two times twelve induction coils 4 arranged on top of each other are connected to a generator. The tray transport cart illustrated in FIG. 1 which consists of two rows of 12 layers of coil carriers 3 is thus equipped with two generators 5. Tray holding devices 8 which are arranged at the same elevation as the coil carriers 3 are situated on the inner side of the side walls 6 and on the central wall 7.

Figure 2:
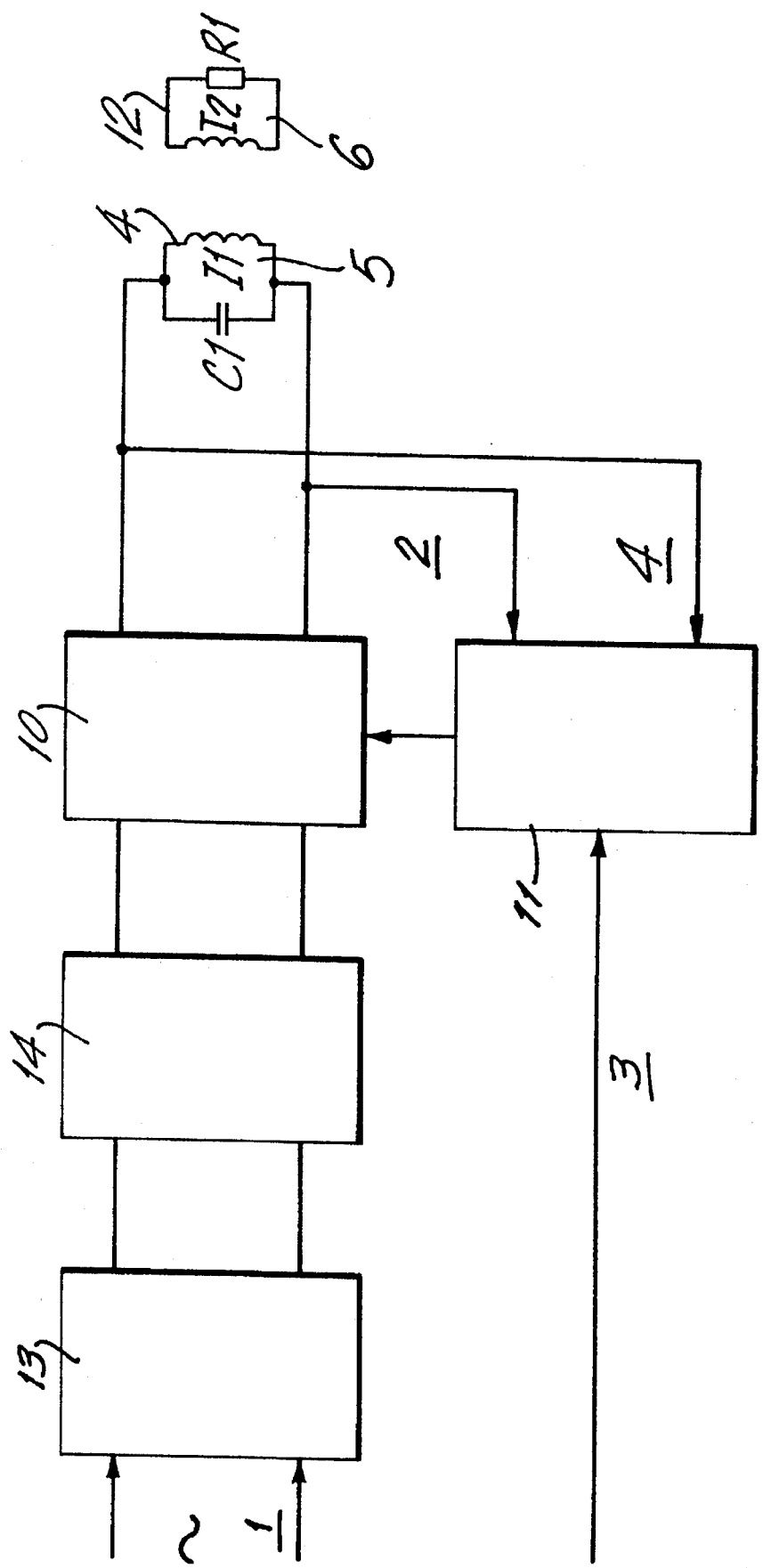
FIG. 2 is a circuit diagram of the generator according to the invention.

FIG. 2 schematically illustrates an electronic controller 11 to control the alternating current which generates an alternating electromagnetic field in the induction coil 4. This alternating field induces an induction current in the load circuit 12. This load circuit 12 corresponds to the metallic containers or the metallic coatings of the dishes. The total inductance of the induction coils 4 connected to the HF generator 5 lies within a range between 32 µH and 76 µH. The amplitude of the alternating current in a resonance circuit 25 which, in addition to coil 4, includes a capacitor C1 would actually be damped exponentially by the load circuit 12 which has a coil 12 and resistor R1. The load circuit 25 12 would also use the energy stored in the resonance circuit within a few milliseconds. In order to maintain the amplitude at the required value, electric energy is supplied from the power line by a filter circuit 13 and a rectifier 14 via the switching circuit 10. The controller 11 determines the required quantity from the difference between the nominal value and the actual value. The current is in the switching circuit 10 limited to nonhazardous values for the circuit elements by means of a saturable reactor. An IGBT (Isolated Gate Bipolar Transistor) which is controlled by the controller 11 is utilized as the circuit element. The particular advantage of an IGBT in comparison to conventional thyristors utilized for generators can be seen in the fact that the IGBT is surprisingly well-suited to utilization of the HF generator according to the invention since it may be switched on and off as compared to a thyristor and is able to process switching times of only a few microseconds. Specifically, the current peaks are reduced from 150 A to a maximum of 80 A since the switching frequency of an IGBT is approximately twice that of a thyristor. The load circuit 12 of the induction heater is according to the invention constructed as a metallized or current-conducting dish. The alternating electromagnetic field induces an induction current in the electrically conductive dish which in turn leads to the fact that the dish 16 and its meal are maintained at the proper temperature. The current-conducting dishes may be realized by a metallic coating or a metallic layer. The induced current thus directly heats the dish. Depending on the type of meal, the meals are additionally covered with a cloche 17 as is, for example, illustrated in FIG. 3. This cloche 17 usually consists of a double-walled plastic dome 18 which is filled with a hard foam insulation 19. A current-conducting foil 20 is according to the invention inserted into this plastic dome 18. The cloche 17 heated by the induction current thus keeps the meals warm from the top without forming condensation water.

Different current densities may be obtained with different types of metallic coatings applied to the lower side of the dishes, which in turn results in different heating effects. Plates which are entirely coated on their lower side are frequently utilized. Plates with different coatings distributed over their surfaces have proven particularly advantageous because the temperature may thus be maintained at different local levels.

In order to optimally utilize the induction heating, the meals, in reference to the induction coils must be correspondingly positioned. This is obtained by means of trays which are on their upper side provided with elements maintaining the position of the dishes, for example, lifters, ribs, or depressions which make it possible to position the dishes in such a way that they may not be interchanged. This means that food containers such as soup bowls, plates, and so forth are assigned a preset position on the tray and thus also in the tray transport cart.

Additional developments of the transport and temperature maintenance system according to the invention are subject to expert competence. The dishes may in particular be coated in an asymmetrical fashion, or the generator may be fed by a power supply that does not depend on a power line.

We claim:

1. Tray transport cart accommodating a plurality of trays arranged in rows comprising:

a movable cart body;

an HF generator for connection to a power source;

a plurality of tray carriers for supporting said trays and being mounted in rows on said cart body said tray carriers having induction coils connected to said generator for generating a local alternating electromagnetic field at said tray carriers;

said trays being configured to support thereon dishes for containing meals, selectively above or next to said coils;

said dishes being at least partially provided with a first current-conducting layer and with an insulating cover, to an inner side of which a second current-conducting layer is applied;

said generator including circuit means for maintaining a total inductance of said coils of said plurality of tray carriers in a range between 32 µH and 76 µH regardless of the number of said plurality of tray carriers in actual use, a desired induction current being generated in said conducting layers that are in use.

2. Tray transport cart according to claim 1, wherein said cart is shielded in respect to the outside against high-frequency electromagnetic interference.

3. Tray transport cart according to claim 1, wherein said HF generator circuit means includes a filter, a rectifier coupled to said filter, and an electronic switch coupled to said rectifier, said generator generating an alternating current in said induction coils and further including a controller coupled to and controlling said switch to provide said switch with a set value.

4. Tray transport cart according to claim 3, wherein current peaks of the alternating current generated by said coils do not substantially exceed 80 A.

5. Tray transport cart according to claim 4, wherein said switch is an Isolated Gate Bipolar Transistor.

6. Tray transport cart according to claim 1, wherein said trays include a material which is not electrically conductive, each tray having an upper side provided with elements which maintain the position of the dishes next to or above said induction coils said coils being arranged in said tray carriers installed in said cart body in such a way that cold meals and meals to be kept warm may not be interchanged.

7. Tray transport cart according to claim 6, wherein each of said dishes is provided with at least one of said current-conducting layers, wherein each dish may be maintained at a constant temperature by means of an inductance.

8. Tray transport cart according to claim 7, wherein said cover provided with said second current-conducting layer includes an insulating cloche to keep the meal warm from above.

9. Tray transport cart according to claim 8, wherein said current-conducting layer is applied to an inner side of an insulating layer of said cloche.

10. Tray transport cart according to claim 7, wherein said current-conducting layer is distributed in an irregular fashion and is conductive in an uneven fashion.

* * * * *